United States Patent
Tang (10) Patent No.: US 7,699,364 B2
(45) Date of Patent: Apr. 20, 2010

(54) HOUSING OF FOLDABLE DEVICE

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/143,833

(22) Filed: Jun. 23, 2008

(65) Prior Publication Data

US 2009/0167035 A1 Jul. 2, 2009

(30) Foreign Application Priority Data

Dec. 27, 2007 (CN) .................... 2007 1 0203481

(51) Int. Cl.
*E05C 3/12* (2006.01)
*E05C 3/04* (2006.01)

(52) U.S. Cl. .............. 292/219; 292/210; 292/220; 292/224; 292/226; 292/347; 292/DIG. 38

(58) Field of Classification Search ............ 292/210, 292/219, 220, 224, 226, 347, DIG. 38
See application file for complete search history.

(56) References Cited

U.S. PATENT DOCUMENTS

| | | | | |
|---|---|---|---|---|
| 193,092 A * | 7/1877 | Joyce | .................... | 292/224 |
| 429,948 A * | 6/1890 | Page | .................... | 292/224 |
| 477,446 A * | 6/1892 | Page | .................... | 292/224 |
| 1,674,965 A * | 6/1928 | Ferris | .................... | 292/124 |
| 1,750,812 A * | 3/1930 | Netschert | .................... | 292/98 |
| 1,753,700 A * | 4/1930 | Graff et al. | .................... | 74/545 |
| 1,763,693 A * | 6/1930 | Ferris | .................... | 292/124 |
| 3,410,247 A * | 11/1968 | Dronberger | .................... | 116/311 |
| 4,094,210 A * | 6/1978 | Wirtz et al. | .................... | 74/553 |
| 5,551,793 A * | 9/1996 | Lewis | .................... | 403/322.1 |
| 6,581,422 B1 * | 6/2003 | Chang | .................... | 70/70 |

* cited by examiner

*Primary Examiner*—Carlos Lugo
(74) *Attorney, Agent, or Firm*—Zhigang Ma (57) ABSTRACT

An exemplary housing of a foldable device includes a first cover, a second cover, a knob, a latching member, and an elastic member. The first cover includes a first latching portion. The second cover includes a fixing portion. The latching member includes a second latching portion configured for engaging with the first latching portion. The knob is rotatably positioned on the second cover. At least a portion of the knob is exposed out of the second cover. The knob connects with the latching member. The elastic member connects to the latching member. The knob is able to drive the latching member to rotate relative to the fixing portion along a first circular direction and the elastic member is able to drive the latching member to rotate relative to the fixing portion along a second circular direction opposite to the first circular direction.

7 Claims, 7 Drawing Sheets

HOUSING OF FOLDABLE DEVICE

BACKGROUND OF THE INVENTION

1. Field of the Invention

The present invention generally relates to housings of foldable devices, and particularly, to a housing typically used for a notebook.

2. Discussion of the Related Art

Figure 6:
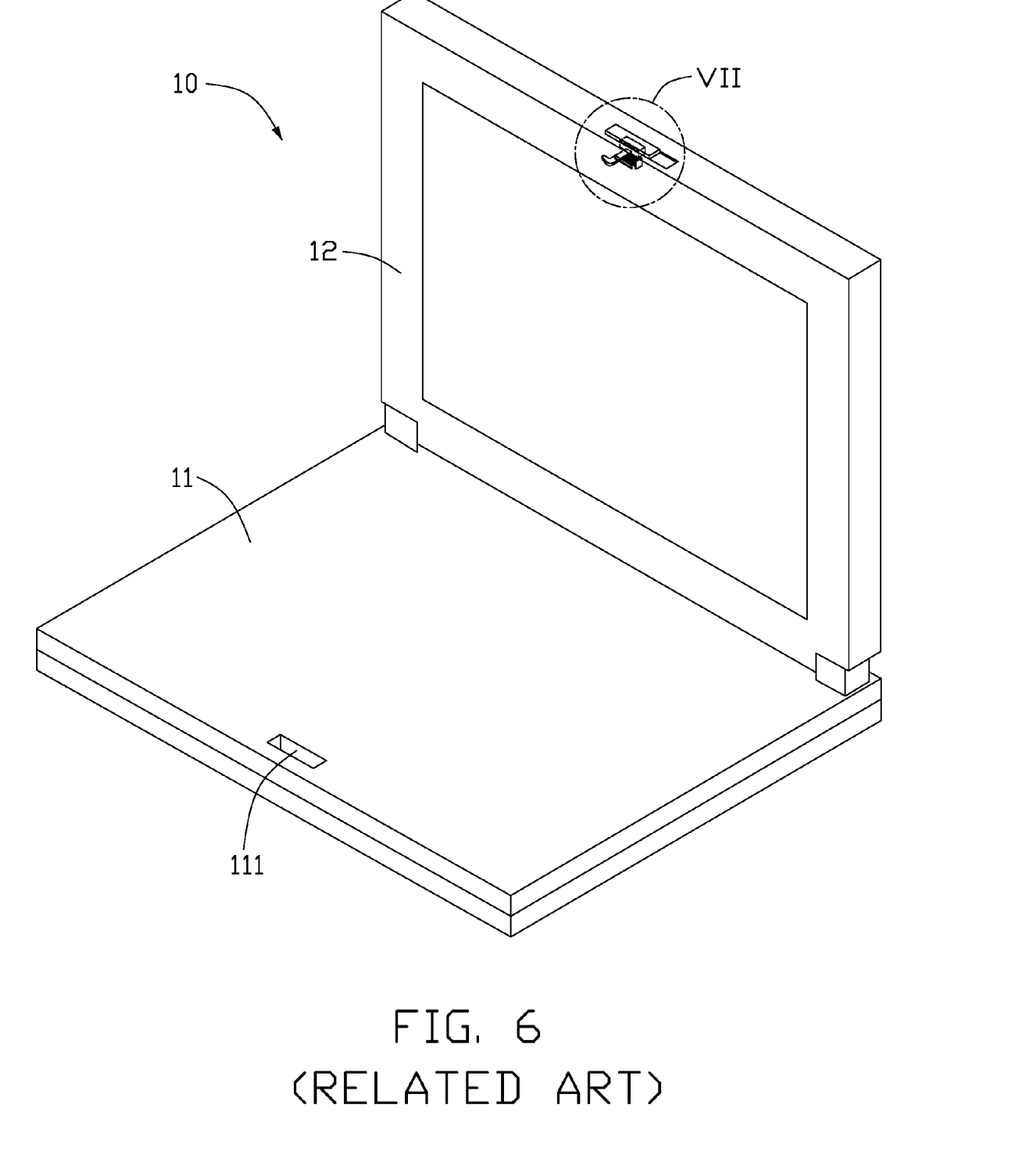
FIG. 6 is an isometric view of a conventional housing of a foldable device.
Figure 7:
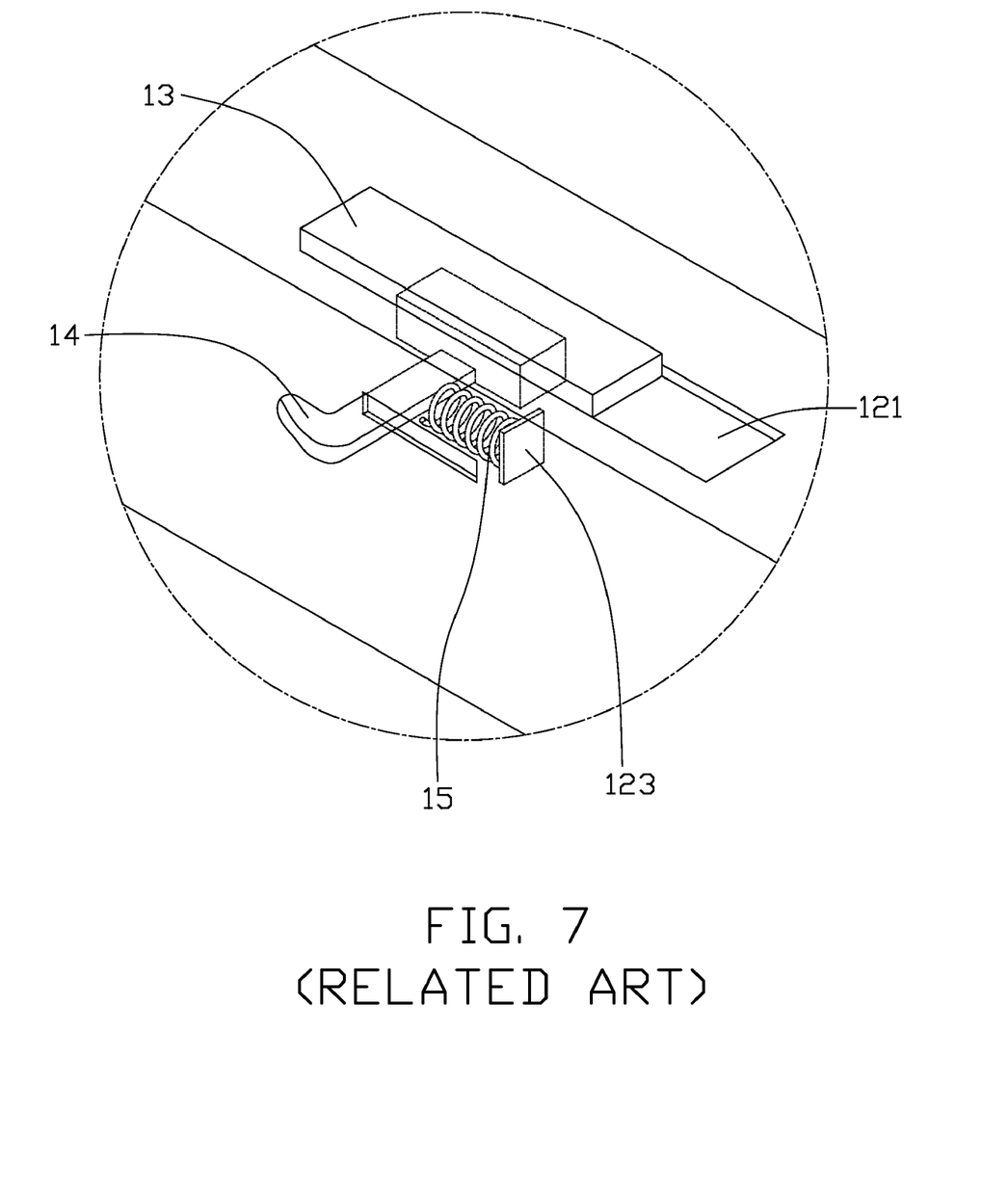
FIG. 7 is an enlarged view of the circled portion VII in FIG. 6.

Referring to FIGS. 6 and 7, a typical housing 10 of a foldable electronic device is shown. The housing 10 includes a bottom cover 11, a top cover 12, a sliding member 13, a hook 14, and a spring 15. The bottom cover 11 defines a latching groove 111 adjacent to an edge of the bottom cover 11. The top cover 12 defines a rectangular mounting groove 121 on an edge of the top cover 12 and forms a resisting member 123 adjacent to the mounting groove 121. The sliding member 13 is a rectangular block in shape. The sliding member 13 is slidably disposed in the mounting groove 121. The latching groove 111 is configured to receive the hook 14. The hook 14 includes an end fixed to the sliding member 13 so that the hook 14 is able to slide together with the sliding member 13. One end of the spring 15 abuts the resisting member 123 and the other end of the spring 15 abuts the sliding member 13 so that the hook 14 and the sliding member 13 are kept at one end of the mounting groove 121.

In use, if an user wants to open the top cover 12, the user has to pry the sliding member 13 and drive the sliding member 13 to move towards the other end of the rectangular groove 121 with a finger. However, the mounting groove 121 is filled with dust easily, result that the sliding member 13 is hard to move in the mounting groove 121. As a result, it is difficult to open the top cover 12.

Therefore, a new housing of a foldable device is desired in order to overcome the above-described shortcoming.

SUMMARY

A housing of a foldable device includes a first cover, a second cover, a knob, a latching member, and an elastic member. The first cover includes a first latching portion. The second cover includes a fixing portion. The latching member includes a second latching portion configured for engaging with the first latching portion. The knob is rotatably positioned on the second cover. At least a portion of the knob is exposed out of the second cover. The knob connects with the latching member. The elastic member connects to the latching member. The knob is able to drive the latching member to rotate relative to the fixing portion along a first circular direction and the elastic member is able to drive the latching member to rotate relative to the fixing portion along a second circular direction which is opposite to the first circular direction.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing of the foldable device. Moreover, in the drawings, like reference numerals designate corresponding parts throughout several views, and all the views are schematic.

DETAILED DESCRIPTION OF THE PREFERRED EMBODIMENT

Reference will now be made to the drawings to describe a preferred embodiment of the present housing of the foldable device in detail.

The present housing is used for foldable devices, such as notebooks, cell phones, media players, and so on. In a preferred embodiment, a housing of a notebook is taken as exemplary device to describe the housing of the present invention.

Figure 1:
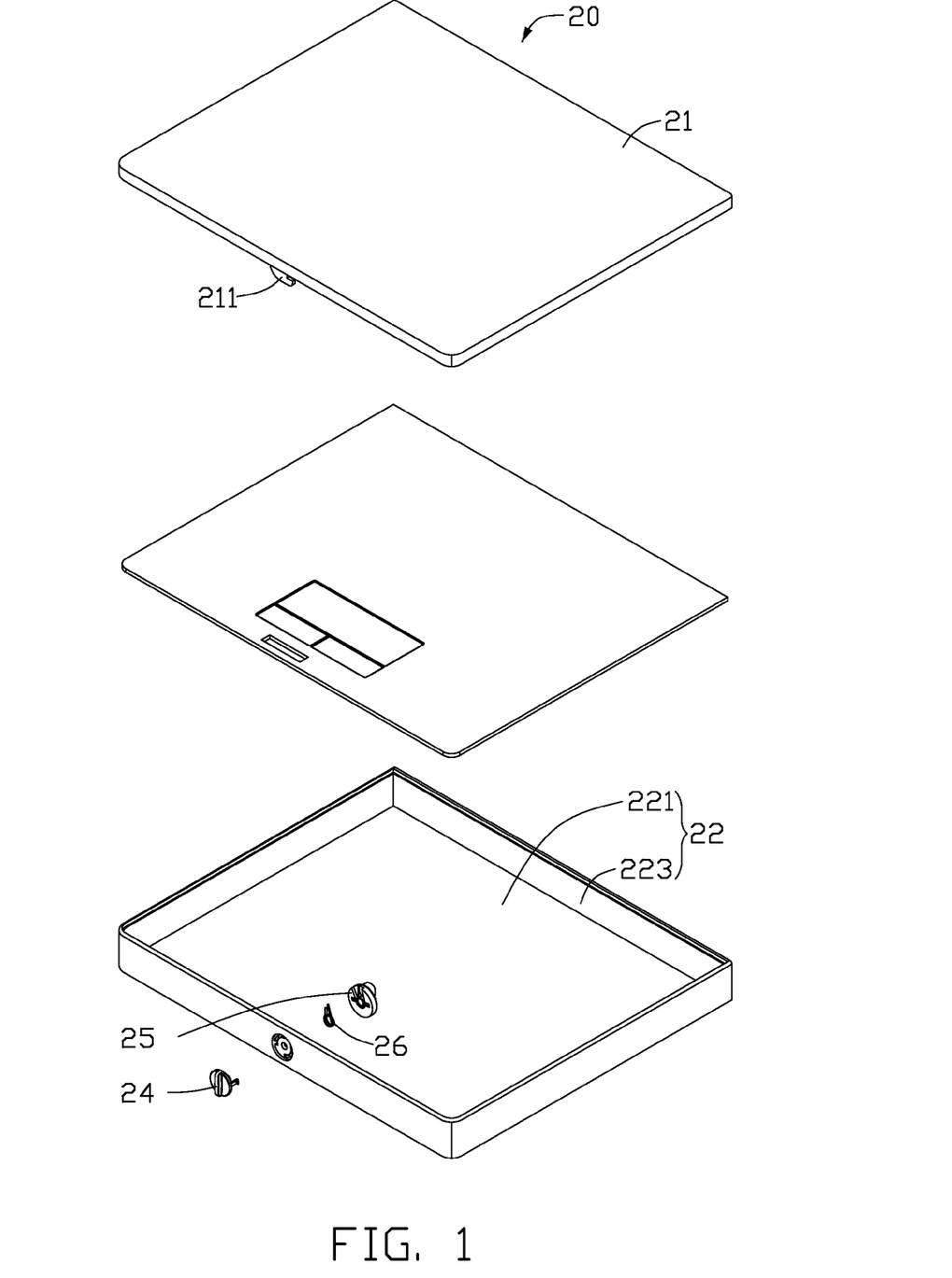
FIG. 1 is an exploded, isometric view of a housing of a foldable device in accordance with a preferred embodiment of the present invention.

Referring to FIG. 1, a housing 20 of the preferred embodiment for a notebook is shown. The housing 20 includes a first cover 21, a second cover 22, a knob 24, a latching member 25, and an elastic member 26. The first cover 21 includes a first latching portion 211 that is substantially a resilient hook. The second cover 22 includes a base 221 and a plurality of sidewalls 223. The sidewalls 223 extend from the base 221. The knob 24, the latching member 25, and the elastic member 26 are positioned on the second cover 22.

Figure 2:
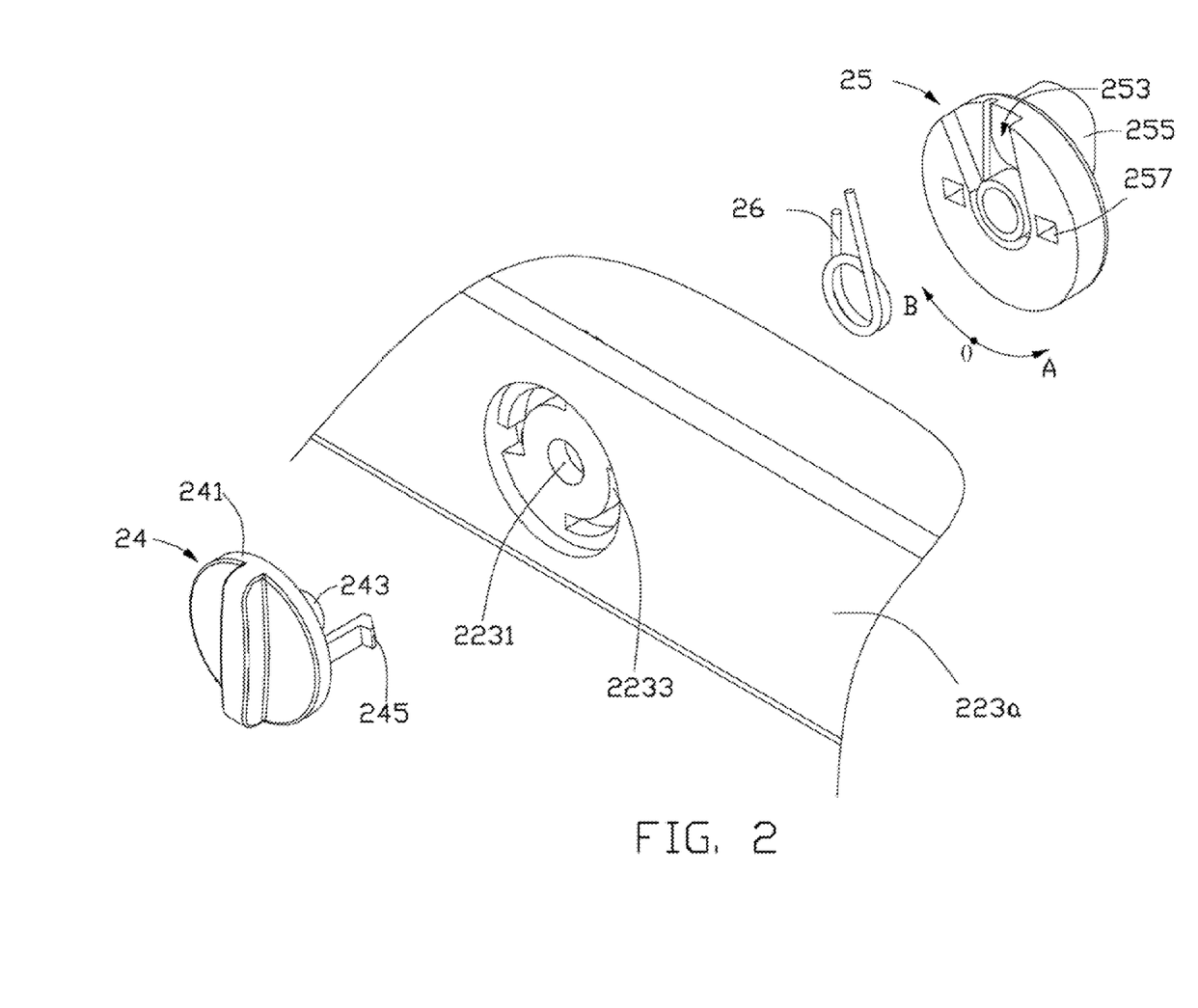
FIG. 2 is an enlarged view of a portion of the housing of FIG. 1.
Figure 3:
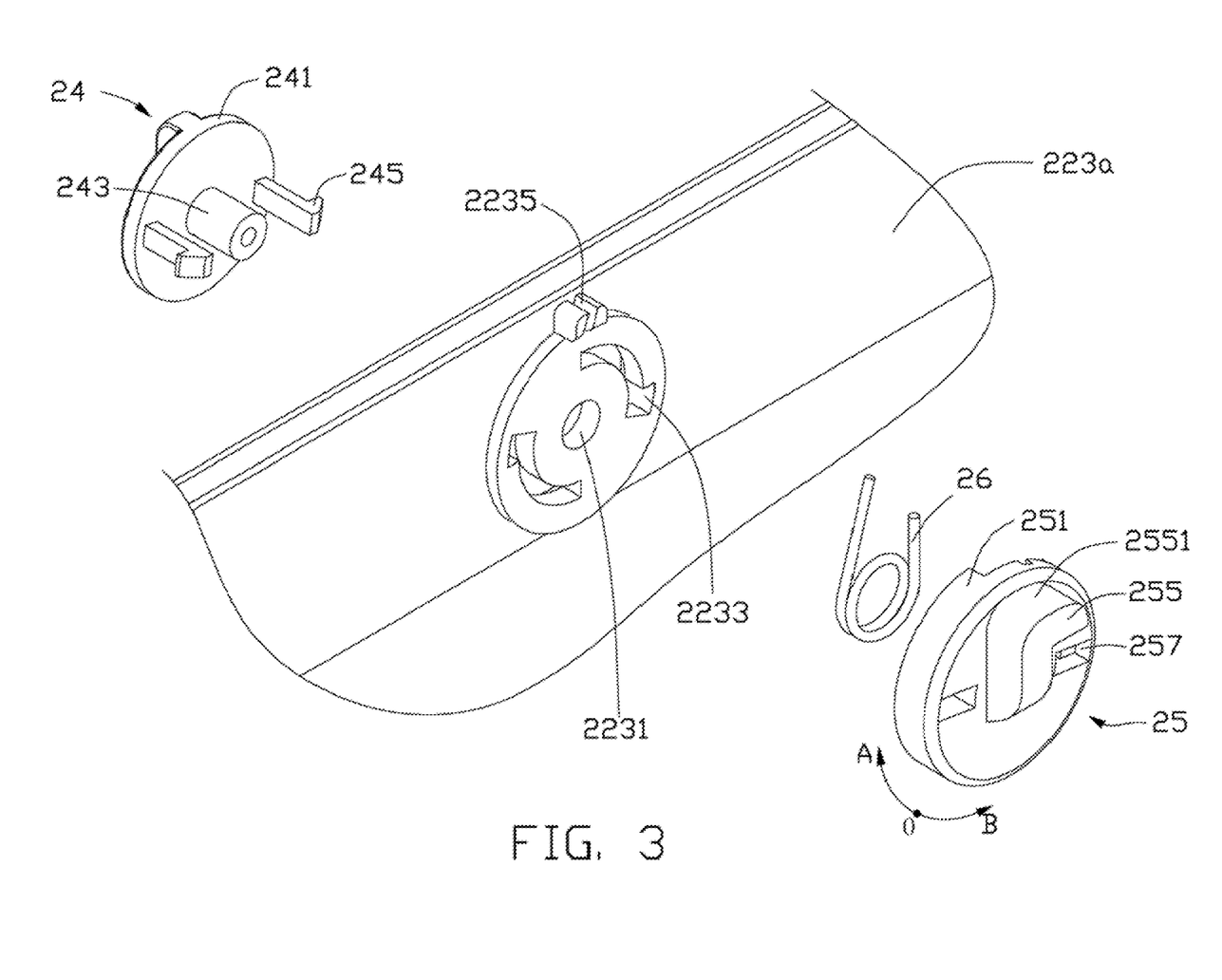
FIG. 3 is similar to FIG. 2, but showing the housing viewed from another aspect.

Also referring to FIGS. 2 and 3, one of the sidewalls 223 (hereafter front sidewall 223a) of the second cover 22 defines a fixing portion 2231 and two curved pivot holes 2233 adjacent to the fixing portion 2231. In the illustrated embodiment, the fixing portion 2231 is a through hole. Each of the curved pivot holes 2233 substantially forms an arc of a circle with a center located in the centre of the fixing portion 2231. In addition, the front sidewall 223a also forms a resisting portion 2235 adjacent to the curved pivot holes 2233.

The knob 24 includes a circular base plate 241, a pivot shaft 243, and two arms 245. The pivot shaft 243 and the arms 245 are formed on a side of the base plate 241, and the arms 245 are adjacent to the pivot shaft 243. A diameter of the pivot shaft 243 is smaller than that of the fixing portion 2231 such that the pivot shaft 243 is able to pass through the fixing portion 2231 and to be fixed on in the fixing portion 2231. The arms 245 are able to pass through the curved pivot holes 2233 and slide in the curved pivot holes 2233. The arms 245 are able prevent the knob 24 from wiggling, in some time, the arms 245 cane be omitted.

The latching member 25 includes a base plate 251 and a second latching portion 255 formed on one side of the base plate 251. The base plate 251 further defines a notch 253 in the other side of the base plate 251. The notch 253 is configured for fixing the elastic member 26. The second latching portion 255 is configured for engaging with the first latching portion 211 of the first cover 21. In addition, the base plate 251 also defines two assembling holes 257 configured for engaging with the arms 245.

In the illustrated embodiment, the second latching portion 255 is a resilient hook. In addition, a top surface 2551 is curved, so that the first latching portion 211 can easily slide against it in locking and unlocking the first cover 20 and second cover 22.

The elastic member 26 is a torsion spring. The latching member 25 and the elastic member 26 are separately formed. It can be understood that, the elastic member 26 also can be integrally formed with the latching member 25.

To assemble the housing 20, the pivot shaft 243 of the knob 24 is passed through the fixing portion 2231. The arms 245 are passed through the curved pivot holes 2233 and engage in the assembling holes 257 correspondingly. The elastic member 26 is fixed in the notch 253 with one end of the elastic member 26 resisting the resisting portion 2235. Thus, the knob 24 and the latching member 25 are located on opposite sides of the front sidewall 223a correspondingly and the knob 24 is able to drive the latching member 25 to rotate around the first circular direction OA. The elastic member 26 connects the latching member 25 to the resisting portion 2235. Therefore, when the latching member 25 rotates around the first circular direction OA, the elastic member 26 pushes the latching member 25 to rotate around a second circular direction OB opposite to the first circular direction OA. In addition, a portion of the knob 24 is exposed out of the second cover 22 such that a user can grasp it easily.

Figure 4:
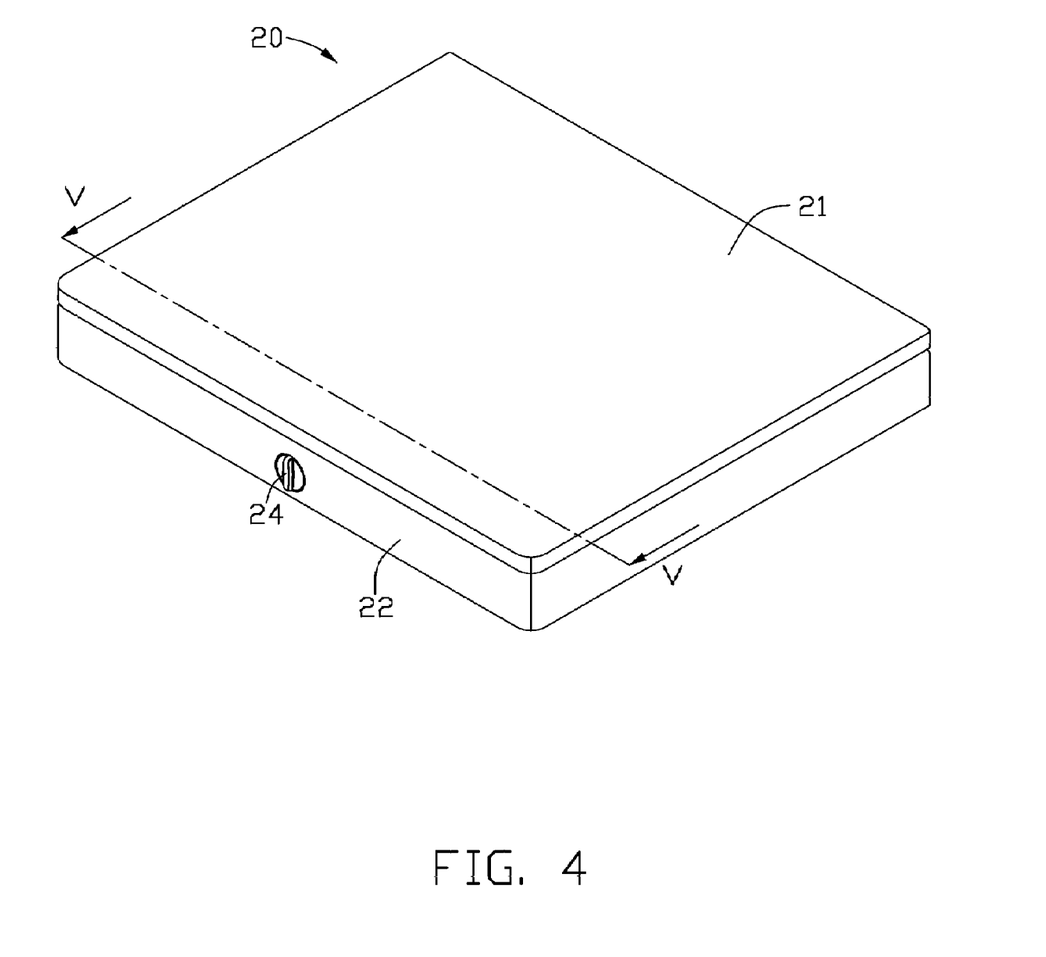
FIG. 4 is an assembled, isometric view of the housing in FIG. 1 when it is folded.
Figure 5:
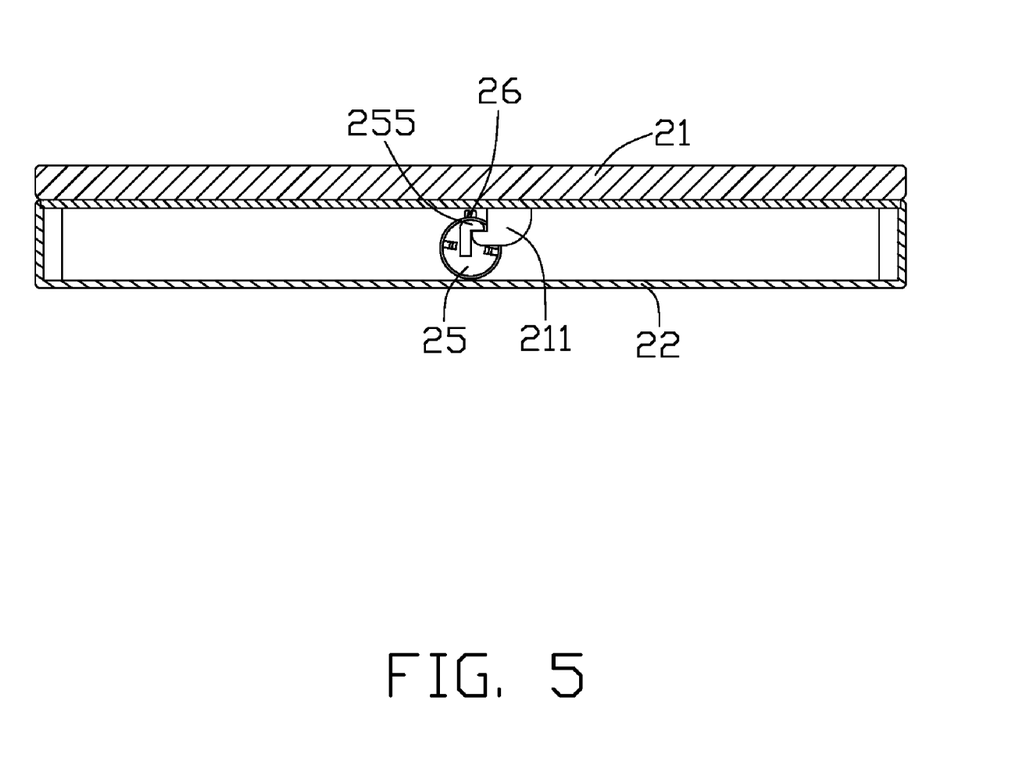
FIG. 5 is a side, cross-sectional view of the housing in FIG. 4, taken along the line V-V in FIG. 4.

Referring to FIGS. 4 and 5, when the notebook is in a folded state, the first cover 21 is closed and abuts the second cover 22. In this state, the first latching portion 211 is latched/secured to the second latching portion 255.

To open the first cover 21, the knob 24 is rotated along the second circular direction OB, then the knob 24 drives the latching member 25 to rotate along the second circular direction OB and the first latching portion 211 does not move, as a result, the elastic member 26 becomes deformed and accumulates energy, simultaneously, the latching member 25 has rotated to a certain angle such that the second latching portion 255 becomes released from the first latching portion 211, and, the first cover 21 can therefore be flipped open by other relevant forces. In the meantime, when the force rotating the knob 24 is released, the knob 24 is pushed back by the elastic member 26 and goes back to its original position.

To fold the first cover 21, an external force is manually applied on the first cover 21. Thus, the outer surface of the first latching portion 211 pushes the curved top surface 2431 of the second latching portion 255 and slides down thereon till two latching portions latch together. The first cover 21 and the second cover 22 are thus securely folded together.

In the above mentioned housing 20, there is no sliding member and groove for receiving the sliding member, thus there is no space for collecting dust. Therefore, none of the members can be substantially blocked by dust in the above mentioned housing 20, and the first cover 21 can easily be flipped opened.

In the above mentioned housing 20, both the first latching portion 211 and the second latching portion 255 are resilient hooks. It should be pointed out that, one of the first latching portion 211 and the second latching portion 255 can be a resilient hook, and another one of the first latching portion 211 and the second latching portion 255 can be a hook holder.

It can be understood that, the latching member 25 also can be integrally formed with the knob 24, and the fixing portion 2231 can be replaced by a circular hole defined in a separated component that is positioned on the second cover 22.

The elastic member 26 also can be integrally formed with the knob 24 and the elastic member 26 can be an elastic sheet. The resisting portion 2235 can also be formed on the base 221 or a separated member positioned on the second cover 22.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A housing of a foldable device, comprising:
a first cover comprising a first latching portion;
a second cover comprising a base, a plurality of sidewalls extending from the base, and a fixing portion formed on one of the sidewalls, and defining a curved pivot hole adjacent to the fixing portion, wherein the curved pivot hole and the fixing portion are located on the same sidewall;
a knob comprising a pivot shaft and an arm, and the knob rotatably positioned on the fixing portion and at least a portion of the knob being exposed out of the second cover;
a latching member having a second latching portion configured for engaging with the first latching portion, and an assembling hole configured for engaging with the arm, wherein the assembling hole and the second latching portion are apart with an interval; and
an elastic member connecting to the latching member;
wherein the pivot shaft passes through the fixing portion, and the arm passes through the curved pivot hole to engage in the assembling hole so that the latching member is fixed on the arm and the pivot shaft, and the knob and the latching member are located on opposite sides of the sidewall portion respectively; the knob is able to drive the latching member to rotate relative to the fixing portion along a first circular direction, the elastic member is able to drive the latching member to rotate relative to the fixing portion along a second circular direction which is opposite to the first circular direction.

2. The housing of the foldable device as claimed in claim 1, wherein the curved pivot hole substantially forms an arc of a circle with a center located in the centre of the fixing portion.

3. The housing of the foldable device as claimed in claim 1, wherein the second cover forms a resisting portion adjacent to the fixing portion, the latching member comprises a notch configured for fixing the elastic member, the elastic member is a torsion spring, the torsion spring is fixed to the notch with one end of the torsion spring resisting the resisting portion.

4. The housing of the foldable device as claimed in claim 1, wherein the latching member and the second latching portion are separately formed.

5. The housing of the foldable device as claimed in claim 1, wherein at least one of the first latching portion and the second latching portion is a resilient hook.

6. The housing of the foldable device as claimed in claim 5, wherein a top surface of the second latching portion is curved.

7. A latching structure for a foldable device, comprising:
a first latching portion formed on a first cover of the foldable device;
a fixing portion formed on a second cover of the foldable device, wherein the second cover comprises a base and a plurality of sidewalls extending from the base, and defines a curved pivot hole adjacent to the fixing portion; the fixing portion is formed on one of the sidewalls; the curved pivot hole and the fixing portion are located on the same sidewall; and the fixing portion is a through hole;
a knob comprising a pivot shaft and an arm, and the knob rotatably positioned on the fixing portion, a latching member having a second latching portion configured for engaging with the first latching portion, and an assembling hole configured for engaging with the arm, wherein the assembling hole and the second latching portion are apart with an interval; and an elastic member connected to the latching member;

wherein the pivot shaft passes through the fixing portion, the arm passes through the curved pivot hole to engage in the assembling hole so that the latching member is fixed on the arm and the pivot shaft, and the knob and the latching member are located on opposite sides of the sidewall portion respectively; the knob is able to drive the latching member to rotate relative to the fixing portion along a first circular direction, the elastic member is able to drive the latching member to rotate relative to the fixing portion along a second circular direction which is opposite to the first circular direction.

* * * * *